US007154688B2

(12) United States Patent
Oshimi et al.

(10) Patent No.: US 7,154,688 B2
(45) Date of Patent: Dec. 26, 2006

(54) DISK DEVICE HAVING A FUNCTION TO CONFIRM THAT A SELECTED HEAD IS PROPER FOR A DISK SURFACE

(75) Inventors: Iwao Oshimi, Odawara (JP); Kiyotada Itou, Odawara (JP); Katsumoto Onoyama, Hiratsuka (JP); Yosuke Hamada, Odawara (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 386 days.

(21) Appl. No.: 10/365,394

(22) Filed: Feb. 13, 2003

(65) Prior Publication Data

US 2004/0042113 A1 Mar. 4, 2004

(30) Foreign Application Priority Data

Sep. 4, 2002 (JP) ............................ 2002-258761

(51) Int. Cl.
*G11B 5/09* (2006.01)

(52) U.S. Cl. ........................... 360/48; 360/49; 360/63; 360/75

(58) Field of Classification Search ............ 360/48–49, 360/75, 63, 53, 51, 31, 78.08, 78.14, 77.08
See application file for complete search history.

(56) References Cited

U.S. PATENT DOCUMENTS

| | | | | |
|---|---|---|---|---|
| 6,104,558 | A * | 8/2000 | Greenberg et al. | 360/49 |
| 6,421,194 | B1 * | 7/2002 | Buch et al. | 360/48 |
| 6,590,728 | B1 * | 7/2003 | Yang | 360/48 |
| 6,876,511 | B1 * | 4/2005 | Koyanagi | 360/75 |

FOREIGN PATENT DOCUMENTS

| | | |
|---|---|---|
| JP | 5-174498 | 7/1993 |
| JP | 10-269729 | 10/1998 |
| JP | 11312372 A * | 11/1999 |

* cited by examiner

*Primary Examiner*—Andrea Wellington
*Assistant Examiner*—Dan I Davidson
(74) *Attorney, Agent, or Firm*—Mattingly, Stanger, Malur & Brundidge, P.C.

(57) ABSTRACT

In a disk device in which heads are positioned by a servo mechanism, the object of the present invention is to prevent data from being destroyed by incorrect selection of a head and to improve reliability in recording or reproducing information and to prevent format efficiency from being decreased thereby.

For this object, a SAM pattern in a servo information region is changed for each head and recorded. Then, the SAM pattern is read to determine which head makes access to a disk surface and the head is compared with a head to which a direction of making access is given thereby to make an error check. Moreover, by the use of a marker pattern of rotational synchronization compensating data added to the servo information, an error check of the head making access to the disc surface is conducted.

3 Claims, 5 Drawing Sheets

DISC CONTROLLER
11
MICRO-PROCESSOR
8
D/A CONVERTING CIRCUIT
9
VCM DRIVING CIRCUIT
MOTOR DRIVING CIRCUIT
10
R/W CONTROL CIRCUIT
POSITION SIGNAL DETECTING CIRCUIT
6
7
R/W CIRCUIT
5
VCM
4
3
2
1

SERVO INFORMATION REGION
12
AGC
SAM
SSA
GRAY
13
14
15
16
A-BURST
B-BURST
C-BURST
D-BURST
D-BURST
17
BURST REGION
USER-DATA

SERVO INFORMATION REGION
12
AGC
SAM
SSA
GRAY
A-BURST
B-BURST
C-BURST
D-BURST
D-BURST
USER-DATA
13
14
15
16
17
BURST REGION
18
SAM PATTERN (8 BITS)
CHANGED FOR EACH HEAD
HD#0 (0x12)
HD#1 (0x14)
HD#2 (0x22)
HD#3 (0x24)

SERVO INFORMATION REGION WITH ROTATIONAL SYNCHRONIZATION COMPENSATING DATA
19
AGC
SAM
SSA
GRAY
13
14
15
16
A-BURST
B-BURST
C-BURST
D-BURST
D-BURST
17
BURST REGION
PRO DATA
21
USER-DATA
PRO AGC
PRO AM
PRO DATA
22
23
24
20
INFORMATION WRITTEN WHEN SERVO TRACK WRITER WRITES SERVO INFORMATION

SERVO INFORMATION REGION WITH ROTATIONAL SYNCHRONIZATION COMPENSATING DATA
19
AGC
SAM
SSA
GRAY
13
14
15
16
A-BURST
B-BURST
C-BURST
D-BURST
D-BURST
17
BURST REGION
PRO DATA
21
USER-DATA
PRO AGC
PRO AM
PRO DATA
22
23
24
(0x00)
(0x04)
GR#0 (0x12)
GR#1 (0x14)
GR#2 (0x22)
GR#3 (0x24)

DISK DEVICE HAVING A FUNCTION TO CONFIRM THAT A SELECTED HEAD IS PROPER FOR A DISK SURFACE

BACKGROUND OF THE INVENTION

The present invention relates to a disk device and, in particular, to a disk device that has a servo mechanism, eliminates improper selection of a head to improve reliability in the recording and reproducing of information, and thus can be realized without decreasing format efficiency thereby.

In a conventional disk device, a servo mechanism for positioning a head is an essential technology.

For example, a magnetic disk device is provided with a mechanism part having a voice coil motor (hereinafter referred to as VCM) for driving and positioning a magnetic head which records or reproduces information on or from a disk storing medium on which information is to be recorded and a drive circuit for driving the mechanism part. Then, in order to correctly and at high speed control medium information recorded at a high recording density, a sector servo mode in which the positioning of the foregoing magnetic head is performed based on servo information recorded on the top of a sector of a data recording surface or a servo mode based thereon is generally utilized.

Further, a technology that increases a storage capacity by increasing format efficiency has been proposed for the magnetic disk device strongly required to reduce its size and to increase its capacity. For example, in Japanese Patent Laid-open No. 1993(H5)-174498, entitled "Sector Architecture for Disk File of Fixed Block Mode" is disclosed a technique for deleting an ID region provided to identify a data sector, that is, an "ID-less mode" technique.

A servo information recording region generally includes an automatic gain control (AGC) region, a servo address mark (SAM) region, a servo sector address (SSA) region, a gray code track region, and a burst region.

Then, the magnetic head generates in the AGC region a reference signal of servo information in which detection sensitivity and detection frequency are adjusted, detects the position of the servo information recording region in the SAM region, detects a servo sector number in the SSA region, detects a track position in the gray code track region, and detects the position error information between the tracks in the burst region. In the above-mentioned ID-less mode, the data sector does not include an ID part in which a data sector address (DSA) is stored and thus determines the DSA by the use of the SSA.

In a format mode using the foregoing ID-less mode in the related art, the data sector is detected by identifying a servo sector address (SSA) stored in a servo sector and then converting the SSA into a data sector address (DSA) by the use of a conversion table or the like.

However, this detection of the data sector is to identify the data sector on a track where a head is to be positioned. Thus, in a case where a track different from a desired track is selected by the failure or disoperation of a head switching circuit in a disk device having a plurality of recording surfaces and a plurality of heads, there is a possibility that the incorrect selection will not be detected but the data sector will be misidentified to record or reproduce the data by the use of the incorrect data sector thereby to destroy user's data or to transfer the incorrect data to a host computer.

For this reason, it is required to detect a track where the head is actually positioned.

For the purpose of detecting this incorrect selection of the head, for example, in Japanese Patent Laid-open No. 1998 (H10)-269729 titled "Disk Device" is proposed a technique in which there are provided a data region where data is recorded on or reproduced from the recording surface of a disk, a servo region where servo information used for controlling the positioning of a head over the recording surface of the disk is recorded, and a servo check region (SCF 30 in FIG. 2) where information used for determining an error of positioning a head (error of selecting a head) is recorded; and in which servo check information (head number, cylinder number or the like) stored in the servo check region is reproduced to identify a track over which a head is actually positioned, whereby when data is recorded or reproduced, incorrect selection of the track is prevented thereby to protect user's data.

However, this technique in the related art presents a problem that it can prevent the user's data from being destroyed by the incorrect selection of the head but it needs a new region for the servo check information thereby to inevitably decrease a data region, that is, to incur a decrease in format efficiency.

The present invention has been made to solve the problem of the foregoing technique in the related art. It is the object of the present invention to provide a disk device in which heads are positioned by a servo mechanism and can prevent data from being destroyed by incorrect selection of a head to improve reliability in the recording or reproducing of information and can be realized without decreasing format efficiency thereby.

SUMMARY OF THE INVENTION

In order to accomplish the above-mentioned object, according to the present invention, for a SAM region in a servo information region arranged on a disk recording medium, a pattern of a servo marker in the servo information region included in each disk surface is written differently to make it possible to identify the head number of a head making access to the disk surface. Then, the head number is compared with the head number of a head to which a direction of making access is given thereby to make an error check.

Further, when a plurality of heads record the same servo pattern at the same time when servo information is recorded, it is also recommended that the plurality of heads be treated as one group, a head group number be given to the respective heads, and the head group number be identified by a pattern of its marker.

Still further, when a rotational synchronization component is added to the servo information region, it is also recommended that the head number or the head group number be identified by the pattern of the marker identifying the data.

By providing the foregoing means, in a case where a track different from a desired track is selected by the failure or disoperation of a head switching circuit, it is possible to detect the incorrect selection of the track and to eliminate the need for providing a new region for check and thus to prevent format efficiency from being decreased.

DESCRIPTION OF THE PREFERRED EMBODIMENT

One embodiment in accordance with the present invention will be hereinafter described by the use of FIG. 1 to FIG. 6.

First, the structure of a disk device in accordance with the present invention will be described by the use of FIG. 1 and FIG. 6.

Figure 1:
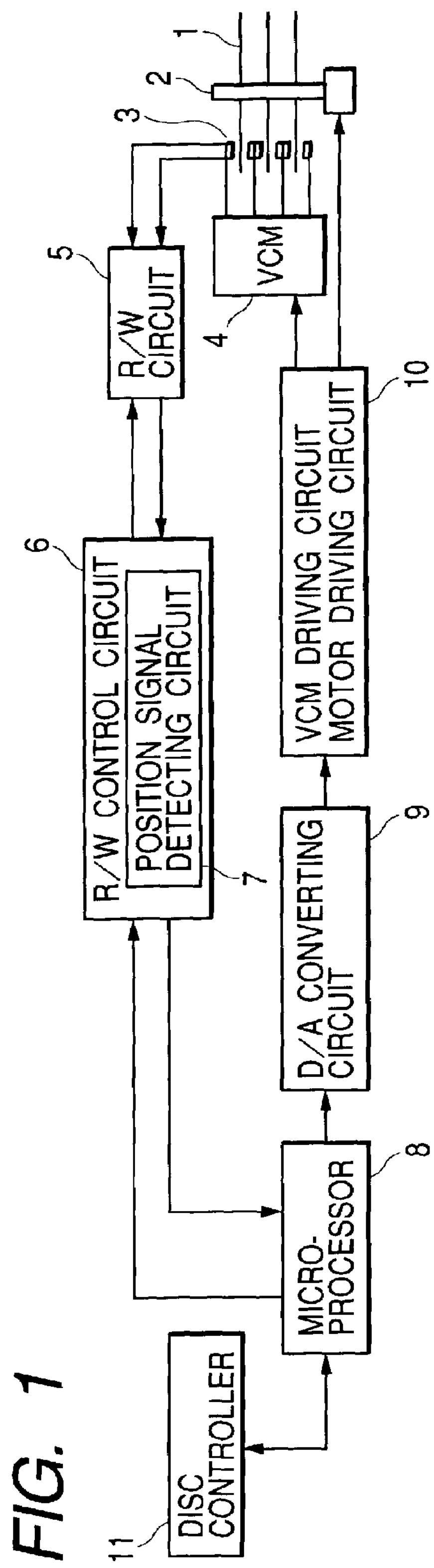
FIG. 1 is a block diagram showing the main part of a magnetic disk device in accordance with the present invention.

FIG. 1 is a block diagram showing the main part of a magnetic disk device in accordance with the present invention.

Figure 6:
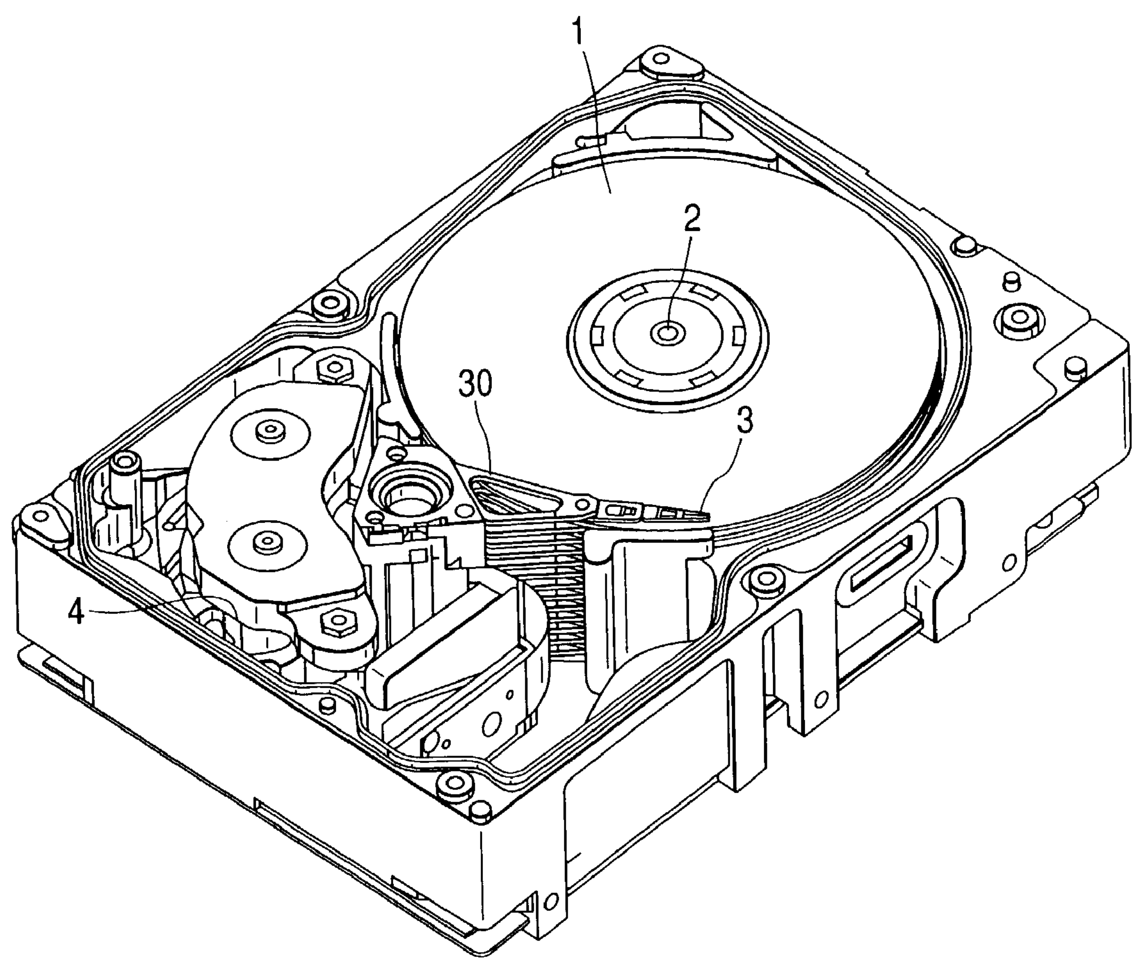
FIG. 6 is a perspective view showing the outer appearance of a mechanism part of a general magnetic disk device.

FIG. 6 is a perspective view showing the outer appearance of a mechanism part of a general magnetic disk device.

In the magnetic disk device shown in FIG. 6, a magnetic disk 1 for magnetically recording information is rotated and the information is read or written by a magnetic head 3 opposed to its disk surface. That is, this magnetic disk 1 is rotated at a constant speed by a spindle motor 2. Then, position information is detected by the magnetic head 3 floating over a position opposed to the magnetic disk 1 and the magnetic head 3 is positioned at a desired position and then data is recorded or reproduced.

The magnetic disk 1 for magnetically recording the information has a plurality of recording surfaces. On the respective recording surfaces are written servo information for positioning the magnetic head 3 at desired positions.

The position information for positioning the magnetic head 3 at the desired position is reproduced by the magnetic head 3 and amplified by a R/W circuit 5 and is sent to a microprocessor 8 via a position signal detection circuit section 7 in the R/W control circuit 6.

In this microprocessor 8, the operation of a control system for positioning the magnetic head 3 based on a position signal is performed and the amount of operation is converted into an analog signal by a digital/analog conversion circuit section 9. Next, this analog signal is sent to a VCM drive circuit 10 for driving a voice coil motor (VCM) 4 to perform the positioning of the magnetic head 3.

Next, the configuration of a general servo sector will be described by the use of FIG. 2.

Figure 2:
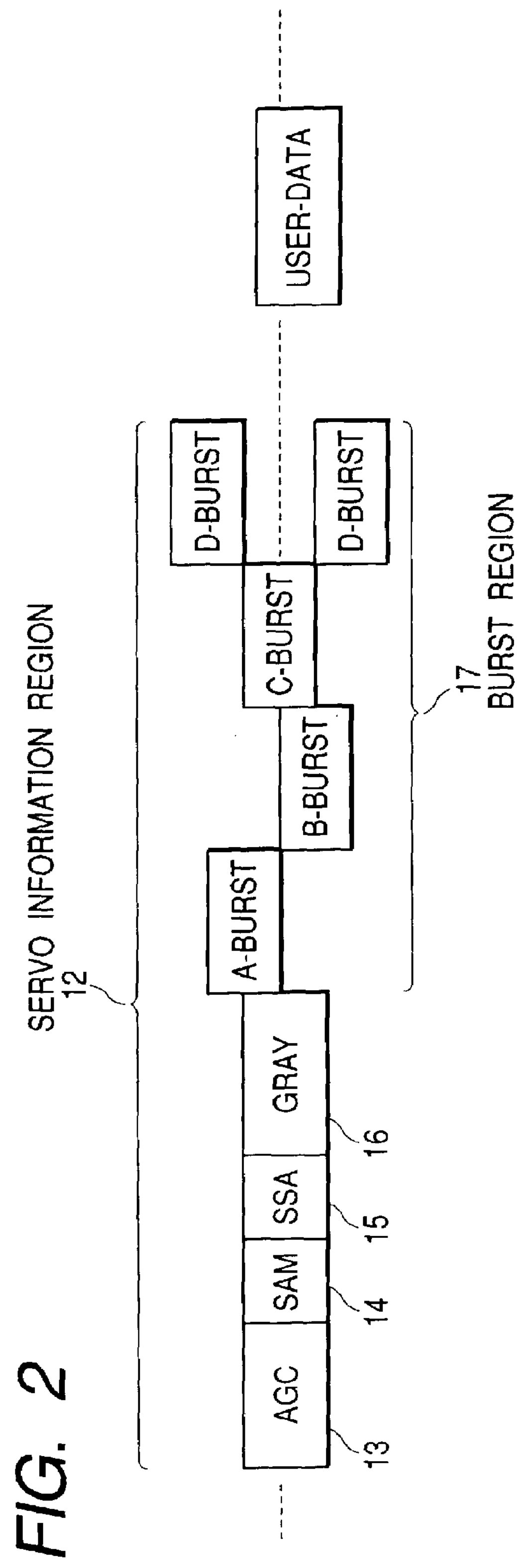
FIG. 2 is a configurational view of a general servo sector.

FIG. 2 is a configurational view of the general servo sector.

As described above, the positioning of the magnetic head 3 is performed based on the position information written in the recording surface of the magnetic disk 1, and a servo information recording region for this positioning of the magnetic head 3 is a servo sector. Here, this servo information is written in advance by a servo track writer (STW) after the magnetic disks 1 and the magnetic heads 3 are assembled. The servo track writer is a device designed specifically for writing a servo track.

The servo sector, as shown in FIG. 2, generally includes an automatic gain control (AGC) region 13, a servo address mark (SAM) region 14, a servo sector address (SSA) region 15, a gray code track region 16, and a burst region 17. Then, the magnetic head 3 generates in the AGC region 13 a reference signal of the servo information in which detection sensitivity and detection frequency are adjusted, detects the position of the servo information recording region in the SAM region 14, detects a servo sector number in the SSA region 15, detects a track position in the gray code track region 16, and detects position error information between the tracks in the burst region 17.

Next, a control relating to the magnetic disk of the present invention will be described by the use of FIG. 3.

Figure 3:
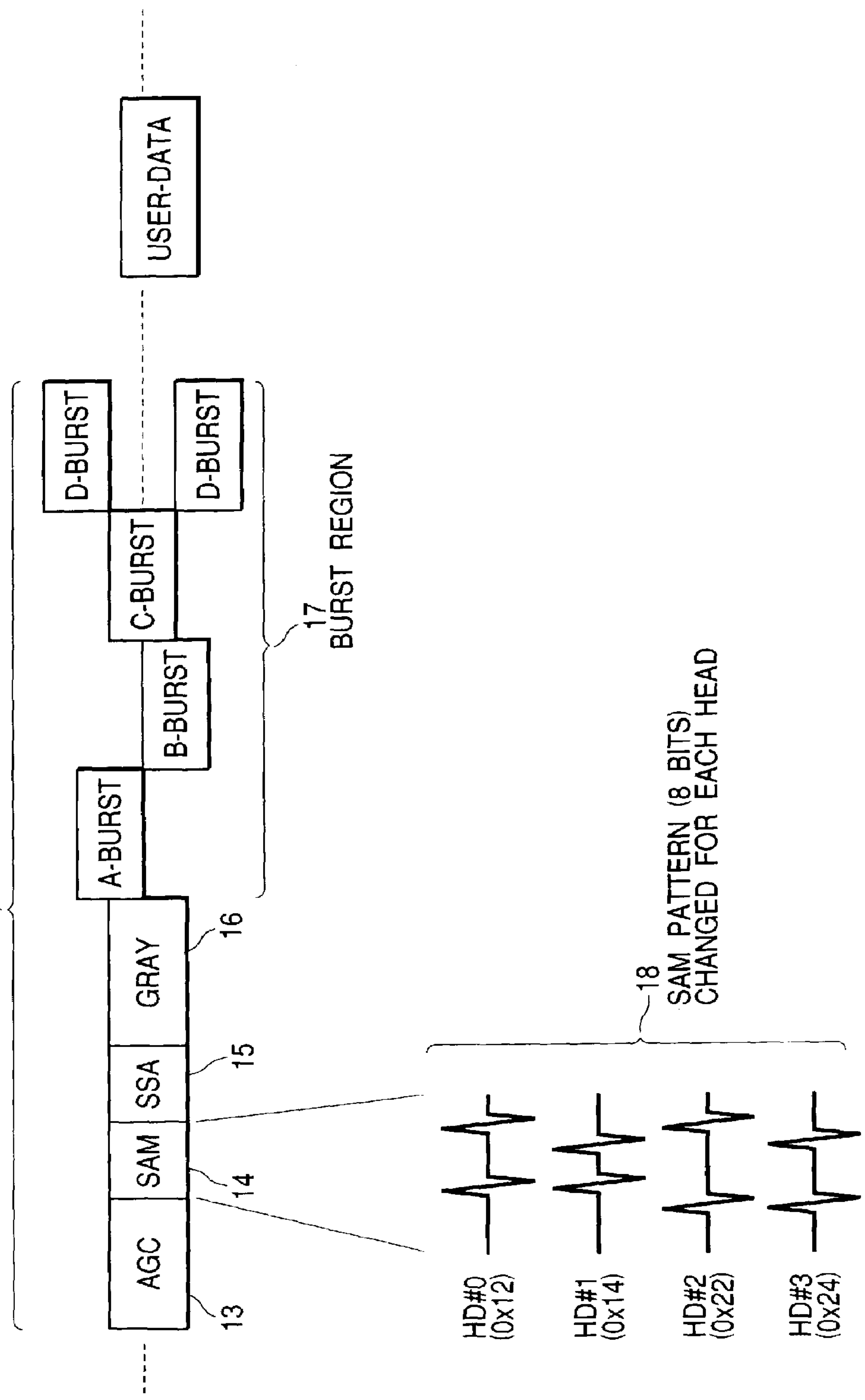
FIG. 3 is a configurational view of a servo sector to illustrate a control relating to a magnetic disk of the present invention.

FIG. 3 is a configurational view of a servo sector to illustrate the control relating to the magnetic disk of the present invention.

In a magnetic disk device in the related art, a pattern in the SAM region 14 is fixed irrespective of the heads. Thus, even in a case where a head actually selected is different from a desired head, this incorrect selection of the head can not be recognized.

In the disk device of the present invention, the patterns in the SAM region 14 are made different for respective heads, as shown in FIG. 3.

Then, the microprocessor 8 sets SAM detection patterns corresponding to the respective heads in the R/W control circuit 6. Then, the R/W control circuit 6 compares, in the R/W control circuit 6, a head to which the R/W circuit gives a direction of reading or writing with a head indicated by the read pattern in the SAM region 14, thereby detecting whether or not the head actually selected is identical to the desired head.

For example, like the SAM pattern 18 shown in FIG. 3, patterns are changed or written differently for the respective heads and recorded in the SAM region 14. In the example shown in FIG. 3, a pattern for a head number #0 is "0×12" and thus when the R/W control circuit 6 performs reading or writing with the head number #0, if the read SAM pattern 18 is "0×12", it is possible to recognize that the SAM is normal in regard to the reading or writing of the head.

For example, in a case where a different pattern (for example, "0×14" corresponding to the head number #1) is recognized, it is recognized from a mismatch between pattern data that the SAM is abnormal in regard to the reading or writing of the head.

Here, as for logic for determining whether the track where the head is actually positioned is correct or not, various variations can be thought. For example, in a case where correct SAMs are detected for n servos (n: natural number) in a row before data is recorded or reproduced, recording or reproducing the data is allowed. Moreover, in a case where incorrect SAMs are detected for m servos (m: natural number) in a row during recording or reproducing the data, recording or reproducing the data is prohibited. In this manner, the logic can be variously applied to determine whether the track is correct or not.

Further, while the SAM pattern shown in FIG. 3 is 8-bit data, it is not intended to limit the SAM pattern to the 8-bit pattern, but when necessary, it is acceptable to change the number of bits or to provide a parity, that is, various SAM patterns can be used.

Next, another control relating to the magnetic disk of the present invention will be described by the use of FIG. 4.

Figure 4:
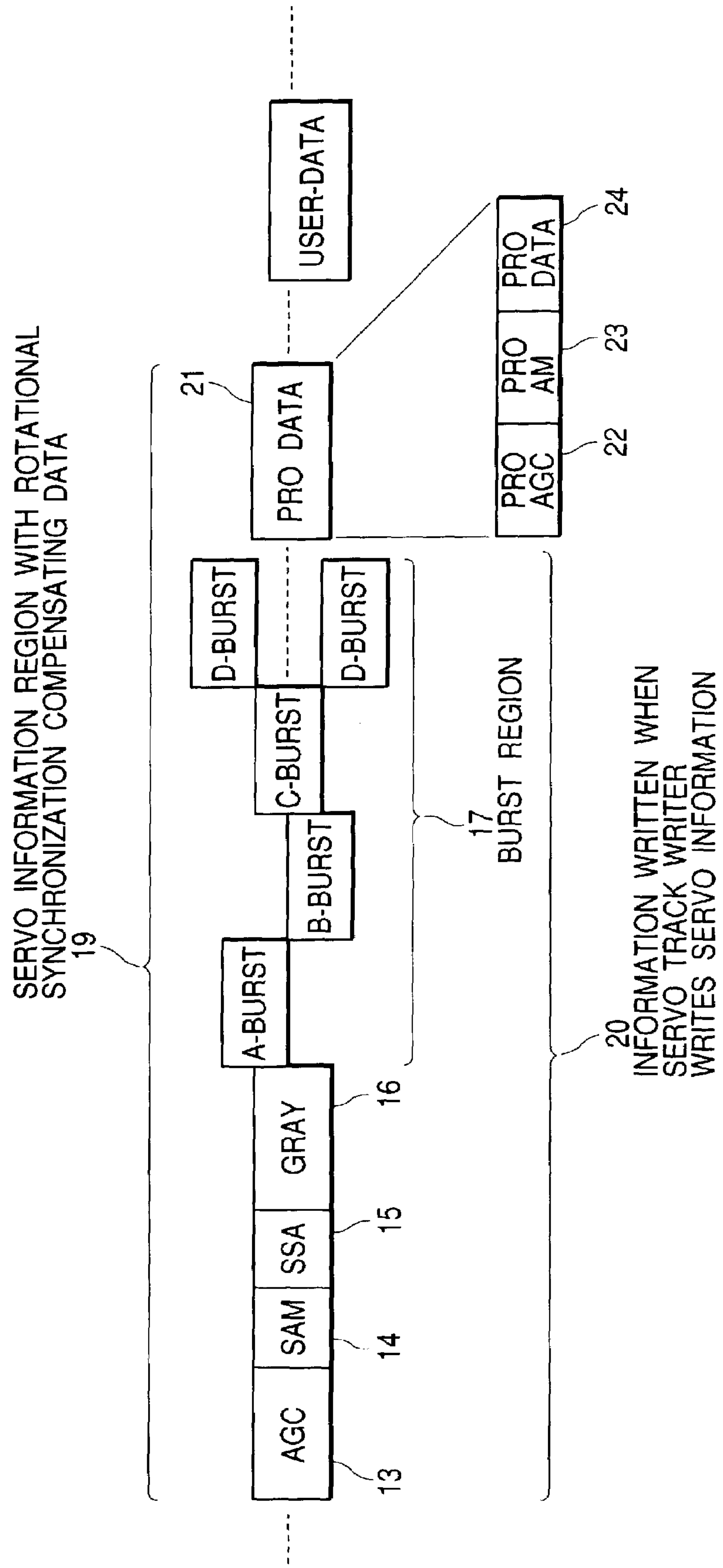
FIG. 4 is a structural view of a servo sector having a rotational compensating data as servo information.

FIG. 4 is a structural view of a servo sector having rotational compensating data as servo information.

Figure 5:
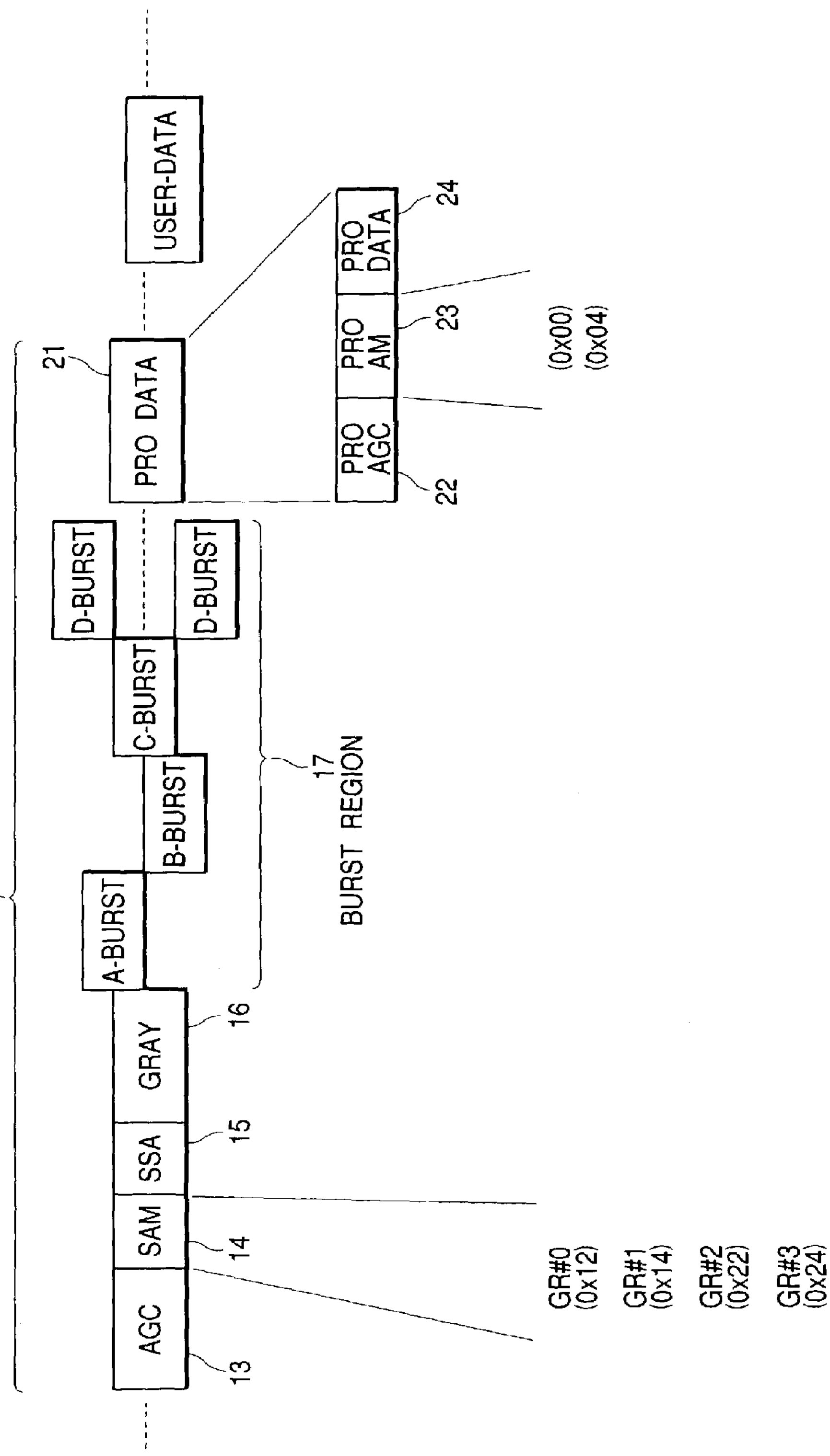
FIG. 5 is a structural view of a servo sector to illustrate the control of a magnetic disk of the present invention having a servo sector having a rotational compensating data as servo information.

FIG. 5 is a configurational view of a servo sector to illustrate the control of a magnetic disk of the present invention having a servo sector having rotational compensating data as servo information.

In recent years, in order to narrow a pitch between tacks and to improve reliability, data for compensating a rotational synchronization component (hereinafter referred to as RRO data) is written in addition to the servo information shown in FIG. 2 to compensate a rotational synchronization component thereby to correct fluctuations of the head.

This RRO data is written in such a manner that the servo information shown in FIG. 2 is written by the STW and then the device is made to learn the servo information in a testing stage.

A servo information region 19 with rotational synchronization compensating data, as shown in FIG. 4, is comprised of a servo information region 20 to which the servo information is previously written at the time the STW writes the servo information and rotational synchronization compensating data (RRO data) region 21 which is written in the testing stage.

The servo information region 20 to which the servo information is previously written at the time the STW writes the servo information, as described above, includes the AGC region 13, the SAM region 14, the SSA region 15, the gray code track region 16, and the burst region 17.

The RRO data region 21 includes an automatic gain control region for RRO data (RRO-AGC region) 22, an address mark region for RRO data (RRO-AM region) 23 and a RRO compensating data region (RRO-data region) 24.

In the RRO-AGC region 22 is generated a reference signal in which detection sensitivity and detection frequency for detecting the RRO data are adjusted and in the RRO-AM region 23 is detected the position of the RRO data region. In the RRO-data region 24 is stored actual compensating data.

In the related art, a fixed pattern is stored in the RRO-AM region 23, but in the present invention, when the RRO data is recorded, a RRO-AM pattern is changed or written differently for each head and recorded in the PRO-AM region 23.

Then, the microprocessor 8 sets RRO-AM detection patterns corresponding to the respective heads in the R/W control circuit 6. Then, the microprocessor 8 compares, in the R/W control circuit 6, the head to which the R/W control circuit 6 gives a direction of reading or writing with the head indicated by the pattern of the RRO-AM region 23 which is read, thereby detecting whether the actually selected head is identical to the desired head or not.

Moreover, as for a logic for determining whether the track where the head is actually positioned is correct or not, in a case where correct RRO-AMs are detected for n servos (n: natural number) in a row before data is recorded or reproduced, recording or reproducing the data is allowed, and in a case where incorrect RRO-AMs are detected for m servos (m: natural number) in a row during recording or reproducing the data, recording or reproducing the data is inhibited. In this manner, various logics can be applied to determine whether the track is correct or not, as is the case with the SAM 14 shown in FIG. 2.

As described above, in a case where additional data (RRO data in the present embodiment) is added to the servo information to impart information of the head to the pattern of marker of the data, it is not always necessary that the SAM pattern be changed for each head and recorded, as described above. As described in FIG. 3, however, when the SAM pattern is changed for each head and recorded and also the RRO-AM is changed for each head and recorded, it is double detected whether the actually selected head is identical to the desired head or not, which can further improve reliability.

Moreover, the STW writes the servo pattern by the head, and a technique is known in which in a case where the same pattern is recorded, a group of heads for recording the same pattern are treated as one group and given a group number and in which the head is checked by the use of the group number at the time when the head makes access.

This is because, usually, writing the servo pattern by the STW takes very much time in the process of manufacturing the magnetic disk and thus writing the same pattern at the same time by as many heads as possible is very efficient.

In this case, a pattern for identifying a head group is buried in the SAM pattern, and when the RRO data is recorded, a RRO-AM pattern is made a pattern capable of at least identifying a head in the head group. Then, by combining the detected SAM pattern and the detected RRO-AM pattern, it is possible to detect whether the actually selected head is identical to the desired head or not.

For example, as shown in FIG. 5, when group numbers of "0×12" for GR #0, "0×14" for GR #1, "0×22" for GR #2, and "0×24" for GR # are recorded in the SAM 14, and small classes for each group of "0×00" and "0×04" are recorded in the RRO-AM 23, it is possible to identify a total of eight heads by combining the SAM 14 with the RRO-AM 23.

In this manner, by identifying the head by the use of the minimum bits used for the SAM pattern and the RRO-AM pattern, it is possible to improve format efficiency.

As described above, according to the present invention, it is possible to provide a disk device in which heads are positioned by a servo mechanism and can prevent data from being destroyed by incorrect selection of a head to improve reliability in the recording or reproducing of information and can be realized without decreasing format efficiency thereby.

What is claimed is:

1. A disk device comprising:

a disk recording medium having information recorded thereon;

a plurality of heads each of which is opposed to each disk surface of the disk recording medium and reads or writes information; and a servo mechanism for positioning the heads at arbitrary positions of the rotating disk recording medium based on servo information previously recorded on the disk surface, wherein synchronization component compensating data for compensating a synchronization component for positioning is provided in addition to the servo information, and for an address mark for identifying the synchronization component compensating data, a pattern of the address mark of the synchronization component compensating data included in each disk surface is written differently and the pattern of the address mark of the synchronization component compensating data is used to confirm whether or not a selected head is proper for the disk surface.

2. The disk device as claimed in claim 1, wherein the address mark of the synchronization component compensating data is read to determine which head makes access to the disk surface, and is compared with a head number of the head to which a direction of making access is given thereby to make an error check.

3. A disk device comprising:

a disk recording medium having information recorded thereon;

a plurality of heads each of which is opposed to each disk surface of the disk recording medium and reads or writes information; and a servo mechanism for positioning the heads at arbitrary positions of the rotating disk recording medium based on servo information previously recorded on the disk surface;

wherein for a servo marker for identifying a servo information region where the servo information is recorded, a pattern of a servo marker in the servo information region included in each disk surface is written differently, synchronization component compensating data for compensating a synchronization component for positioning is provided in addition to the servo information and for a address mark for identifying the synchronization component compensating data, a pattern of the address mark of the synchronization component compensating data included in each disk surface is written differently, wherein the plurality of heads are classified into groups and head group numbers are given to the respective heads, and wherein the head group numbers are recorded by the pattern of the servo marker and a small class of the head in the head group is recorded by the pattern of the address mark of the synchronization component compensating data and both of the head group number and the small class are used to confirm whether or not a selected head is proper for the disk surface.

* * * * *